(12) United States Patent
Kajuch et al.

(10) Patent No.: US 11,213,837 B2
(45) Date of Patent: Jan. 4, 2022

(54) KINETIC WATER DELIVERY DEVICES

(71) Applicant: Kohler Co., Kohler, WI (US)

(72) Inventors: Pete Kajuch, Brookfield, WI (US); Joshua Walter, Plymouth, WI (US)

(73) Assignee: KOHLER CO., Kohler, WI (US)

( * ) Notice: Subject to any disclaimer, the term of this patent is extended or adjusted under 35 U.S.C. 154(b) by 252 days.

(21) Appl. No.: 16/409,005

(22) Filed: May 10, 2019

(65) Prior Publication Data

US 2019/0351436 A1 Nov. 21, 2019

Related U.S. Application Data

(60) Provisional application No. 62/672,931, filed on May 17, 2018.

(51) Int. Cl.
*B05B 3/04* (2006.01)
*B05B 1/02* (2006.01)

(52) U.S. Cl.
CPC .............. *B05B 3/0486* (2013.01); *B05B 1/02* (2013.01)

(58) Field of Classification Search
CPC ....... B05B 3/0427; B05B 3/0486; B05B 3/06; B05B 3/063; B05B 1/02
USPC ................................ 239/224, 237, 380–383
See application file for complete search history.

(56) References Cited

U.S. PATENT DOCUMENTS

| | | | |
|---|---|---|---|
| 5,704,547 A | 1/1998 | Golan et al. | |
| 6,092,739 A | 7/2000 | Clearman et al. | |
| 6,126,091 A | 10/2000 | Heitzman | |
| 6,170,765 B1 | 1/2001 | Gil et al. | |
| 6,254,013 B1 | 7/2001 | Clerman et al. | |
| 7,111,795 B2 | 9/2006 | Thong | |
| 7,584,906 B2 | 9/2009 | Lev | |
| 7,740,186 B2 | 6/2010 | Marcan et al. | |
| 8,297,534 B2 | 10/2012 | Li et al. | |
| 8,418,935 B2 | 4/2013 | Chen et al. | |
| 9,067,218 B2 | 6/2015 | Yu | |
| 9,404,243 B2 | 8/2016 | Cacka et al. | |
| 2012/0053013 A1 | 3/2012 | Pedersen | |

(Continued)

FOREIGN PATENT DOCUMENTS

| | | |
|---|---|---|
| CN | 202238399 | 5/2012 |
| CN | 203030424 | 7/2013 |

(Continued)

OTHER PUBLICATIONS

Chinese First Office Action on CN Patent Application No. 201910401448.7, dated Dec. 10, 2020, 6 Pages with English Language Summary.

*Primary Examiner* — Christopher S Kim
(74) *Attorney, Agent, or Firm* — Foley & Lardner LLP

(57) ABSTRACT

A spray head comprises a body, a rotatable member, and a first bearing. The rotatable member is rotatably coupled to the body and includes a plurality of vanes and a plurality of spray nozzles. The first bearing is coupled to the body and is configured to define a rotational axis of the rotatable member. The first bearing includes a longitudinal channel and a plurality of distribution channels extending radially outwardly from the longitudinal channel through the first bearing. The first bearing is configured to direct a flow of water through the longitudinal channel and the plurality of distribution channels toward the plurality of vanes to rotate the rotatable member about the first bearing, so as to direct the flow of water through the plurality of spray nozzles.

17 Claims, 13 Drawing Sheets

(56) References Cited

U.S. PATENT DOCUMENTS

2015/0174593 A1 6/2015 Gompper et al.
2016/0184841 A1 6/2016 Lin et al.

FOREIGN PATENT DOCUMENTS

| CN | 106733255 | 5/2017 |
| CN | 206996889 | 2/2018 |

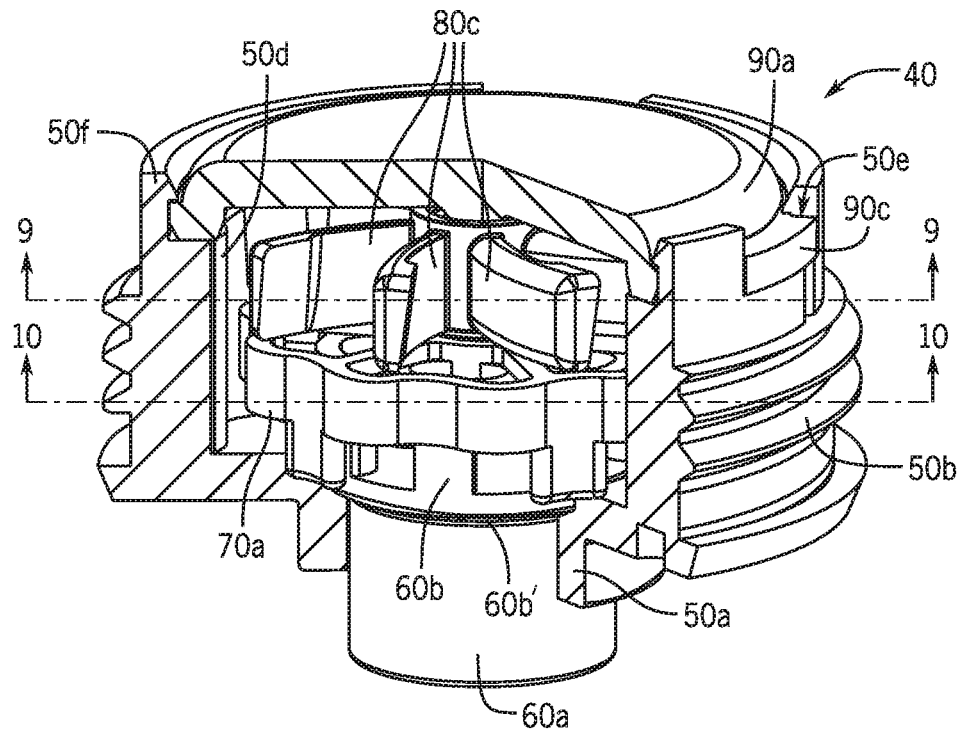
FIG. 8
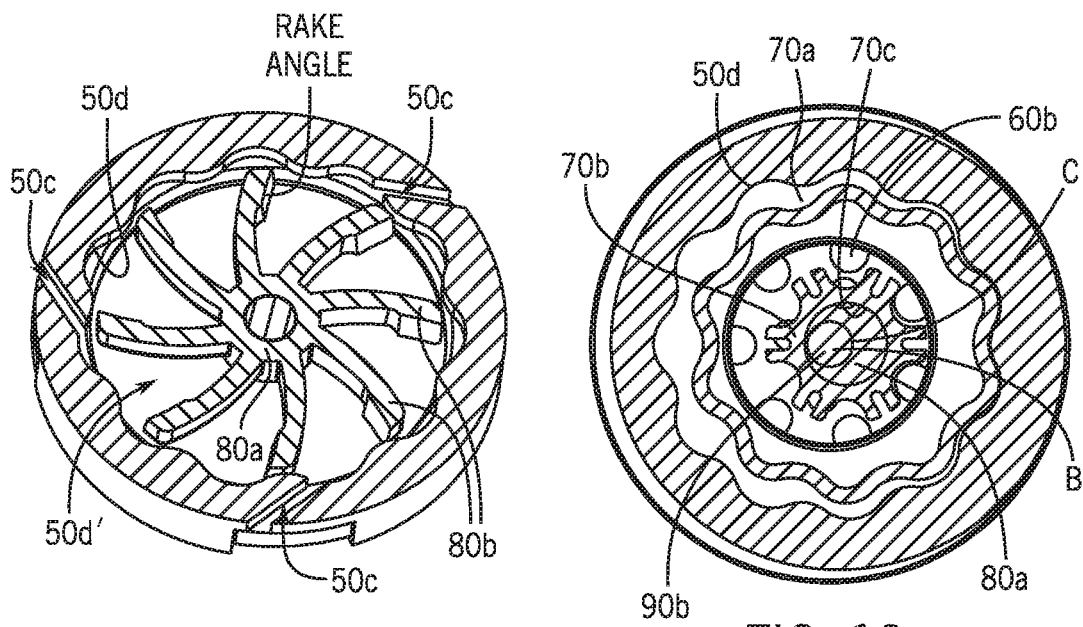
FIG. 9
FIG. 10

KINETIC WATER DELIVERY DEVICES

CROSS-REFERENCE TO RELATED PATENT APPLICATIONS

This application claims the benefit of and priority to U.S. Provisional Application No. 62/672,931, filed May 17, 2018, the entire disclosure of which is hereby incorporated by reference herein.

BACKGROUND

The present application relates generally to water delivery devices. More specifically, the present application relates to spray heads and modular spray assemblies that can maintain spray performance at low inlet flow rates through the use of kinetic energy.

Generally speaking, as water conservation has become increasingly popular for reasons of environmental stewardship or necessary for reasons of droughts and water shortages, the market has demanded water delivery devices, such as shower spray heads, that can reduce water consumption by operating at low inlet flow rates (e.g., less than about 0.90 gpm). Most conventional shower spray heads, however, are unable to provide sufficient spray performance at these low inlet flow rates.

SUMMARY

One embodiment relates to a spray head. The spray head comprises a body, a rotatable member, and a first bearing. The rotatable member is rotatably coupled to the body and includes a plurality of vanes and a plurality of spray nozzles. The first bearing is coupled to the body and is configured to define a rotational axis of the rotatable member. The first bearing includes a longitudinal channel and a plurality of distribution channels extending radially outwardly from the longitudinal channel through the first bearing. The first bearing is configured to direct a flow of water through the longitudinal channel and the plurality of distribution channels toward the plurality of vanes to rotate the rotatable member about the first bearing, so as to direct the flow of water through the plurality of spray nozzles.

In some exemplary embodiments, the plurality of spray nozzles includes a first plurality of spray nozzles and a second plurality of spray nozzles, wherein the first plurality of spray nozzles are each oriented to define a spray axis that is different than the orientation of each spray axis of the second plurality of spray nozzles such that water flowing through the first plurality of spray nozzles and through the second plurality of spray nozzles creates a moment about the rotational axis.

In some exemplary embodiments, the plurality of vanes are configured such that water directed from each of the plurality of distribution channels impinges on a respective vane of the plurality of vanes at a different linear distance from the rotational axis.

In some exemplary embodiments, the longitudinal channel has a length and a diameter, and wherein a ratio of the length to the diameter is greater than one.

In some exemplary embodiments, the spray head further comprises a second bearing for rotatably coupling the rotatable member to the first bearing, wherein the second bearing includes a bottom wall for coupling to the rotatable member and a center wall extending in a longitudinal direction from the bottom wall, and wherein the center wall defines an inner bearing surface configured to rotatably engage the first bearing.

In some exemplary embodiments, the first bearing includes a first cylindrical portion for coupling to the body and a second cylindrical portion for rotatably engaging with the second bearing, and wherein the second cylindrical portion has a diameter that is greater than a diameter of the first portion to define a ledge.

In some exemplary embodiments, the center wall of the second bearing includes a flange extending radially inward toward the rotational axis, and wherein the flange and the ledge of the first bearing cooperatively define a labyrinth seal.

In some exemplary embodiments, the plurality of distribution channels each define an axis, and wherein the first bearing includes a cutout at each of the plurality of distribution channels to define an exterior surface of the first bearing that is oriented substantially perpendicular to a respective axis of the plurality of distribution channels.

Another embodiment relates to a spray head. The spray head comprises a body including a cavity and a modular spray assembly detachably coupled to the body. The modular spray assembly includes a housing, a spray member, a cover, an impeller, and a rotor. The spray member is rotatably coupled to the housing. The cover is coupled to the housing and includes a shaft disposed in the housing. The impeller is rotatably coupled to the shaft. The rotor is rotatably coupled to the impeller and the spray member, and is configured to rotate eccentrically relative to the impeller and the spray member. The housing includes an inlet configured to direct a flow of fluid from the cavity of the body to an interior of the housing to rotate the impeller.

Yet another embodiment relates to a modular spray assembly. The modular spray assembly includes a housing, a spray member, a cover, an impeller, and a rotor. The housing is configured to be coupled to a spray head. The spray member is rotatably coupled to the housing. The cover is coupled to the housing and includes a shaft disposed in the housing. The impeller is rotatably coupled to the shaft. The rotor is rotatably coupled to the impeller and the spray member, and is configured to rotate eccentrically relative to the impeller and the spray member. The housing includes an inlet configured to direct a flow of fluid toward the impeller to rotate the impeller.

In some exemplary embodiments, the housing includes an opening that receives a portion of the spray member therein, and wherein the spray member is configured to rotate about an axis defined by the opening.

In some exemplary embodiments, the spray member includes a first portion disposed in the opening and a second portion extending from the first portion, and wherein the first portion defines a spray face.

In some exemplary embodiments, the second portion has a diameter that is greater than a diameter of the first portion to define a step that engages the housing, and wherein the step and the housing cooperatively define a labyrinth seal.

In some exemplary embodiments, the rotor includes an outer portion rollingly engaged with the housing to define a first stage of gear reduction, and wherein the rotor includes an inner portion rollingly engaged with the spray member to define a second stage of gear reduction.

In some exemplary embodiments, the housing includes an inner surface having an undulating surface profile, and wherein the outer portion of the rotor has an undulating surface profile configured to rollingly engage with the inner surface of the housing.

In some exemplary embodiments, the spray member includes a plurality of castellations that are configured to rollingly engage with the inner portion of the rotor.

In some exemplary embodiments, the impeller includes a plurality of vanes that are pitched to direct fluid received through the inlet of the housing toward the spray member.

BRIEF DESCRIPTION OF THE DRAWINGS

FIG. 8 is a partial cutaway view of the modular spray assembly of FIG. 6.

FIG. 9 is a cross-sectional view taken along line 9-9 of FIG. 8.

FIG. 10 is a partial cross-sectional view taken along line 10-10 in FIG. 8.

DETAILED DESCRIPTION

Referring generally to the FIGURES, disclosed herein is a spray head and a modular spray assembly that are each configured to provide improved spray performance at low inlet flow rates (e.g., less than about 0.90 gpm, etc.), as compared to conventional spray heads used in, for example, a shower environment. The spray head and the modular spray assembly disclosed herein each include structural features and components that are designed to create a unique water spray pattern through rotary motion. This unique water spray pattern can provide the same or similar effect for a user as spray patterns from conventional spray heads that are based on higher inlet flow rates. In addition, by using rotary motion, the disclosed spray head and modular spray assembly can distribute water over a larger surface area and can help to prevent the numbing sensation that can occur as a result of a concentrated water jet impinging on the same area of a user's body, as is the case with many conventional shower spray heads.

According to various exemplary embodiments, the disclosed spray head and modular spray assembly each include a rotatable member or spray face that can rotate, such that streams of water exiting the device are separated into discrete droplets by forces that break the cohesion of the streams. These discrete droplets can be large enough in size and have enough forward velocity to provide an effective user experience, even at low inlet flow rates (e.g., less than about 0.90 gpm, etc.) by, for example, creating a massaging sensation for a user. In contrast, conventional shower spray heads are unable to provide a useful spray at these low inlet flow rates, as the resulting spray pattern would be too wide and too sparse to provide an effective user experience.

Figure 1:
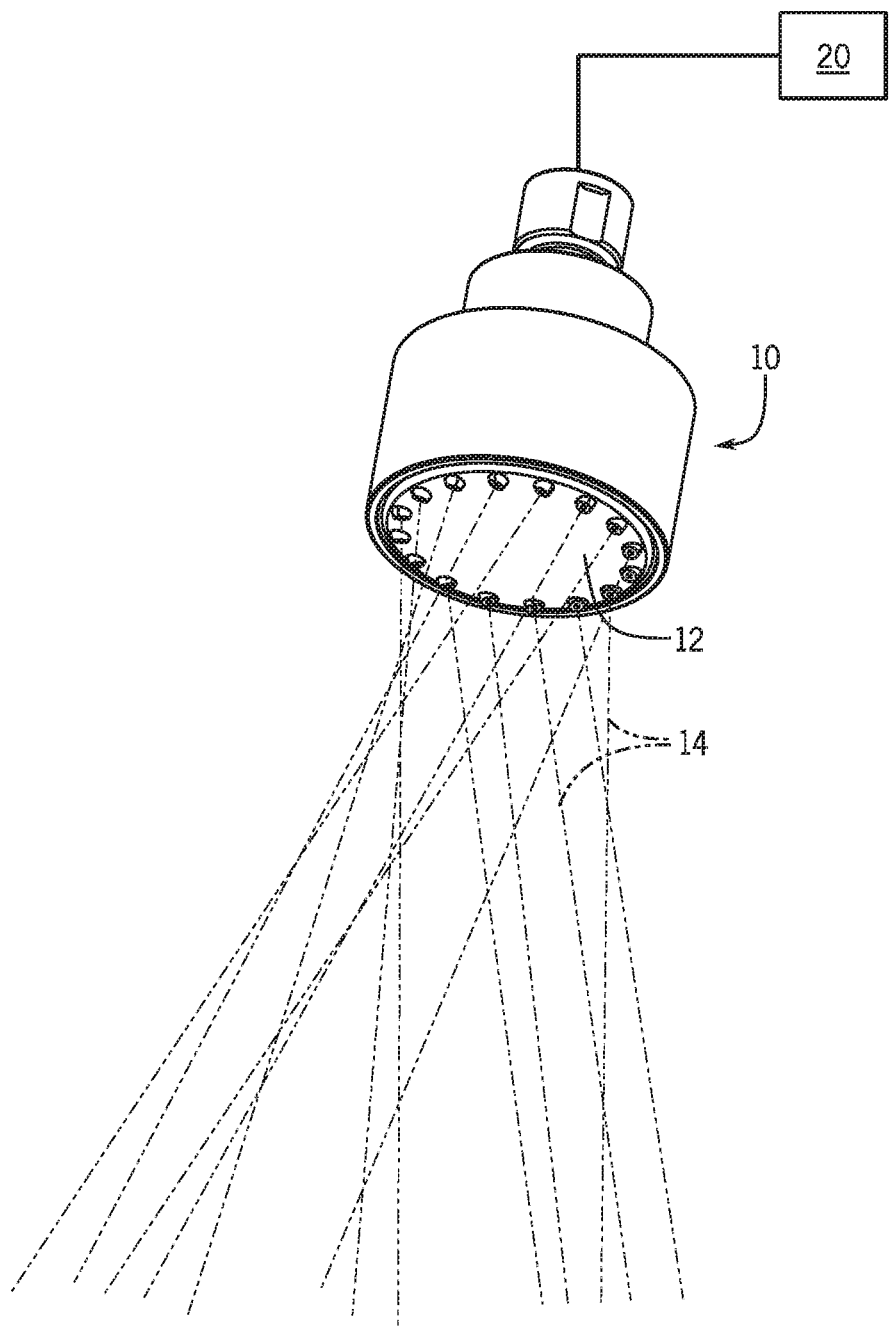
FIG. 1 is a perspective view of a spray head according to an exemplary embodiment.

Referring to FIG. 1, a spray head 10 is shown according to an exemplary embodiment. The spray head 10 is shown fluidly coupled to a water source 20. According to an exemplary embodiment, the water source 20 is a household water supply that is configured to supply a flow of water to the spray head 10 at a low inlet flow rate (e.g., less than about 0.90 gpm, etc.). The spray head 10 includes a rotatable member 12 (e.g., spray face, etc.) that can rotate relative to the spray head by the flow of water received by the spray head. By imparting rotary motion to the rotatable member 12, the spray head 10 can, advantageously, produce a spray pattern including a plurality of discrete droplets 14 that collectively define a generally quadric surface, such as a hyperboloid. This unique spray pattern can provide a more effective user experience, as compared to conventional shower spray heads operating with the same low inlet flow rate.

Figure 2:
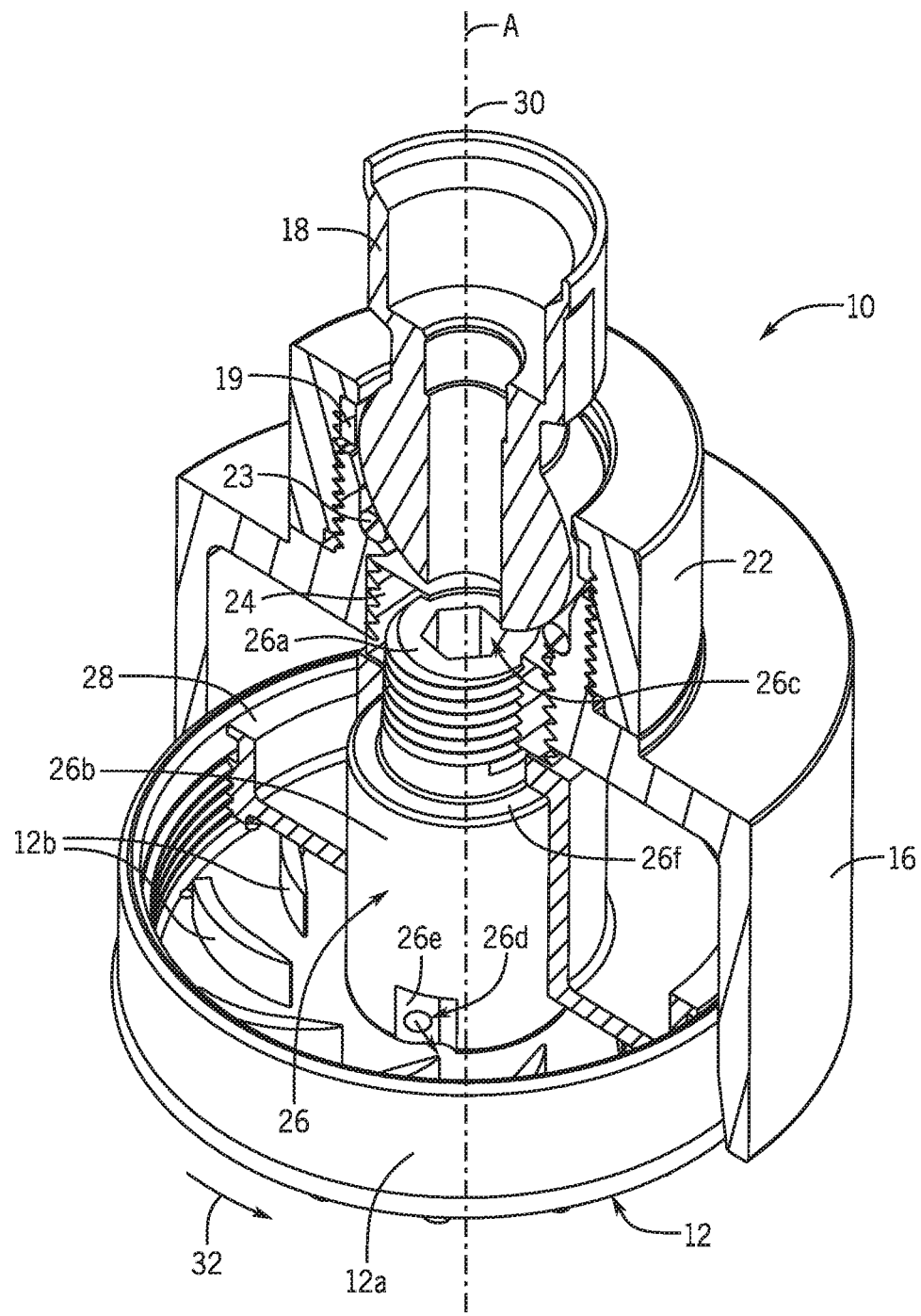
FIG. 2 is a partial cutaway view of the spray head of FIG. 1.

Referring to FIG. 2, the spray head 10 includes a body 16 that is pivotably coupled to a joint 18 via a collar 22. The joint 18 can be coupled to a water supply conduit that can direct a flow of water 30 to the spray head 10 from the water source 20, such as in a shower or other similar type of bathing environment. A seal 23, shown as an O-ring according to an exemplary embodiment, is coupled to an inner portion of the body 16. The seal 23 can sealingly engage a portion of the joint 18, so as to create a watertight seal therebetween while permitting relative pivotable motion between the body 16 and the joint 18.

Still referring to FIG. 2, the spray head 10 further includes a first bearing 26 coupled to the body 16. The first bearing 26 has a generally cylindrical shape and is defined by a first cylindrical portion 26a and a second cylindrical portion 26b. The second cylindrical portion 26b has a diameter that is greater than a diameter of the first cylindrical portion 26a to define a ledge configured to provide a labyrinth seal 26f with a second bearing 28. The first cylindrical portion 26a couples the first bearing 26 to the body 16 via a threaded interface, according to an exemplary embodiment. According to an exemplary embodiment, the first bearing 26 is fixedly coupled to the body 16 via an insert 24 disposed between the body 16 and the first bearing 26. The insert 24 can be made from brass or other similar type of material to provide a watertight seal between the first bearing 26 and the body 16, such that the body 16 can be made from different types of materials or combinations of materials, such as plastic. The first bearing 26 further includes a longitudinal channel 26c that extends in a longitudinal direction from the first cylindrical portion 26a through a substantial portion of the second cylindrical portion 26b. The longitudinal channel 26c terminates within the second portion 26b of the bearing, and is configured to receive the flow of water from the water source 20.

Figure 3:
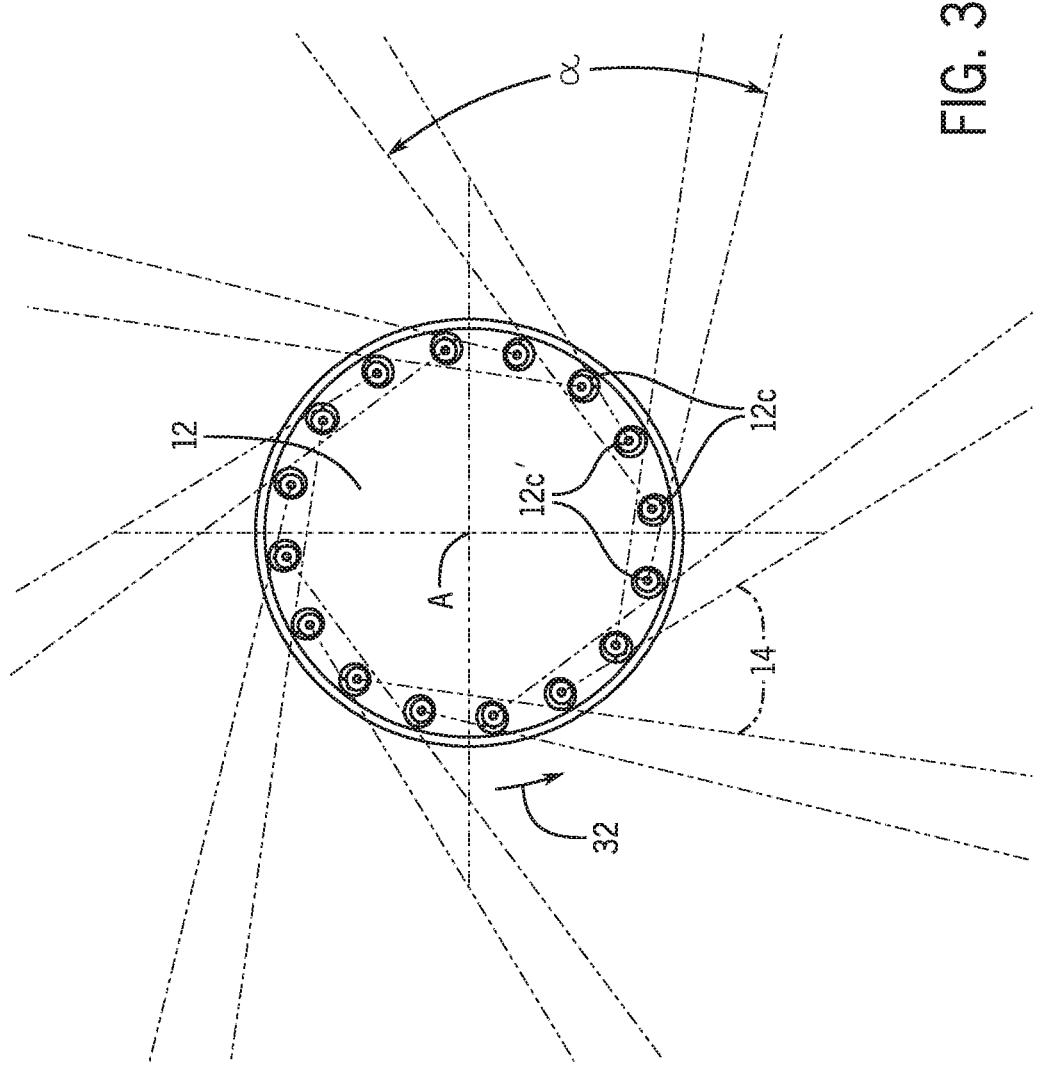
FIG. 3 is a front view of the spray head of FIG. 1.
Figure 4:
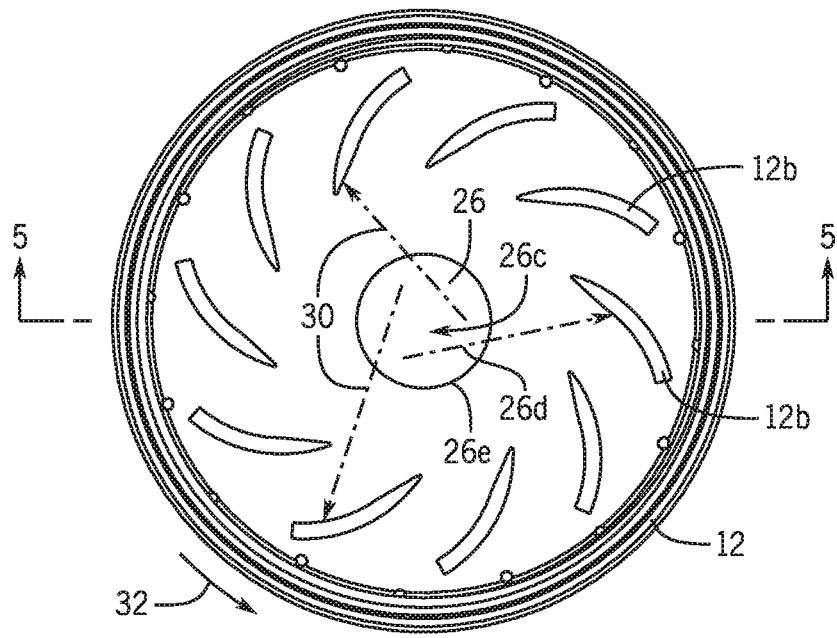
FIG. 4 is a cross-sectional view of the spray head of FIG. 1.

Referring to FIGS. 2-5, a plurality of water distribution channels 26d extend radially outwardly from the longitudinal channel 26c to an exterior of the first bearing 26. The water distribution channels 26d are configured to distribute the flow of water received from the water source 20 in a radial direction from the longitudinal channel 26c to a plurality of vanes 12b extending from the rotatable member 12, the details of which are discussed in the paragraphs that follow. According to the exemplary embodiment shown in FIG. 4, the first bearing 26 includes at least three water distribution channels 26d. According to other exemplary embodiments, the first bearing 26 includes more than three water distribution channels 26d. As shown in FIGS. 2 and 4, each of the distribution channels 26d is oriented substantially tangentially to a periphery of the longitudinal channel 26c. The distribution channels 26d are spaced equidistant relative to each other, so as to provide a balanced distribution of water to the plurality of vanes 12b. Each of the distribution channels 26d has a diameter that is less than the diameter of the longitudinal channel 26c to create sufficient water pressure within the spray head 10. The water jets provided by the distribution channels 26d impinging the vanes 12b are advantageously sized to create enough reaction moment to cause rotation for any desired flow rate. The second cylindrical portion 26b includes a cutout 26e located at each of the distribution channels 26d. The cutouts 26e define an exterior surface of the first bearing 26 that is oriented substantially perpendicular to the respective axis of each of the distribution channels 26d to improve accuracy of aim, which can, advantageously, help to direct the flow of water exiting the distribution channels 26d toward the vanes 12b of the rotatable member 12.

Still referring to FIGS. 2-5, the spray head 10 further includes a rotatable member 12 that is rotatably coupled to the first bearing 26 via a second bearing 28. The rotatable member 12 defines a spray face of the spray head 10. The rotatable member 12 includes a body 12a having a generally cylindrical shape. According to the exemplary embodiment shown, the body 12a is threadably coupled to the second bearing 28 via a plurality of threads disposed on a perimeter wall of the body 12a. The body 12a further includes a bottom wall including a plurality of vanes 12b extending upwardly from an inner surface of the bottom wall. The vanes 12b are configured to drive or rotate the rotatable member 12 upon receiving a flow of water from the distribution channels 26d on the first bearing 26. The body 12a further includes a first plurality of spray nozzles 12c and a second plurality of spray nozzles 12c' extending from an exterior surface of the bottom wall opposite the inner surface. According to the exemplary embodiment of FIG. 3, the first plurality of spray nozzles 12c and the second plurality of spray nozzles 12c' are arranged in an alternating fashion circumferentially about an axis of rotation "A" of the rotatable member 12.

As shown in FIG. 3, the first plurality of spray nozzles 12c are oriented to define a spray axis that is angled compound toward the axis A. The second plurality of nozzles 12c' are oriented substantially tangent to the nozzle pitch circle or diameter of the rotatable member 12. In other words, the first plurality of spray nozzles 12c are each oriented to define a spray axis that is oriented differently than each spray axis of the second plurality of spray nozzles 12c'. In this manner, the second plurality of nozzles 12c' can produce an outer spray and the first plurality of nozzles 12c can produce an inner spray located generally within the outer spray. The outer spray produced by the second plurality of nozzles 12c' can, advantageously, generate a force that creates a moment about axis A to help contribute to the rotation of the rotatable member 12. The outer and inner sprays cooperatively define a spray pattern that has a generally quadric surface shape, such as a hyperboloid (see, for example, FIG. 1).

Referring to FIGS. 2 and 4, the vanes 12b extend generally upright from the inner surface of the bottom wall of the body 12a. Each of the vanes 12b has a generally arcuate shape that curves outwardly away from the axis A. The vanes 12b cooperatively define a turbine or impeller of the spray head 10. For example, as shown in FIG. 2, the flow of water 30 exiting each of the water distribution channels 26d is directed tangentially from the first bearing 26 toward one or more of the vanes 12b. The reaction forces of the flow of water impinging on the vanes 12b causes a moment about axis A that results in rotation of the rotatable member 12. As shown in FIG. 4, the vanes 12b are arranged circumferentially along the bottom wall 12e. The number and spacing of the vanes 12b on the rotatable member 12 is such that the water directed from each of the distribution channels 26d impinges on a vane 12b at a different linear distance from axis A (see FIG. 4). This is particularly advantageous in that the angular velocity of the rotatable member 12 can be maintained relatively constant, so as to prevent stalling of the rotatable member 12 during rotation.

According to an exemplary embodiment, the rotational speed of the rotatable member 12 can be selectively adjusted by moving the location of the water distribution channels 26d relative to the vanes 12b, so as to provide different spray experiences. For example, the spray head 10 may include a lever or a dial, or other similar type of actuator, located externally on the body 16 that can allow a user to selectively adjust the relative location between the water distribution channels 26d and the vanes 12b. In this manner, the spray head 10 can provide a continuously variable spray for a user.

Figure 5:
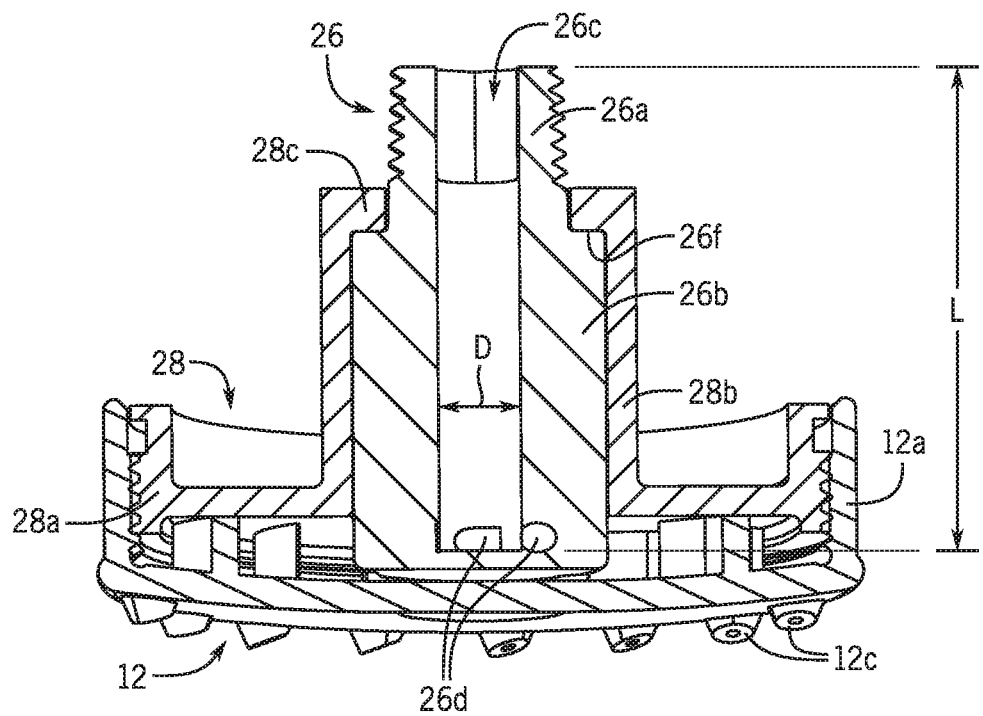
FIG. 5 is another cross-sectional view taken along line 5-5 in FIG. 4.

Referring to FIG. 5, the longitudinal channel 26c of the first bearing 26 has a length "L" and a diameter "D" having a ratio of greater than one to provide stability of the first bearing 26 and the rotatable member 12 during operation. As shown in FIG. 5, the second bearing 28 includes a bottom wall 28a for coupling to the perimeter wall 12a of the rotatable member 12. The second bearing 28 further includes a center wall 28b extending in a longitudinal direction from the bottom wall 28a. The center wall 28b has a generally hollow cylindrical shape, and defines an inner bearing surface (e.g., an outer race) configured to rotate about axis A relative to the second cylindrical portion 26b (e.g., an inner race) of the first bearing 26. The second bearing 28 further includes a flange 28c extending radially inward from the center wall 28b toward axis A. The flange 28c and the ledge of the first bearing 26 include structural features that cooperatively define a thrust face and labyrinth seal 26f therebetween.

In other words, at least one of the flange 28c and the mating portion of the cylindrical portion 26b includes one or more features (e.g., channels, protrusions, etc.) that cooperate with each other to provide a mechanical seal by defining a tortuous path for fluid to flow through (i.e., a labyrinth seal), so as to help to prevent leakage of water flowing through the spray head. For example, the labyrinth seal can be activated by hydraulic pressure acting on the first bearing 26 (e.g., through the longitudinal channel 26c) and on the rotatable member 12 in opposite directions, such that the flange 28c and the ledge of the first bearing 26 are urged toward each other when a fluid is flowing through the longitudinal channel 26c. This configuration is particularly advantageous, because this improved seal design eliminates the need for a traditional elastomer seal, which can cause rotational resistance and can wear over time.

Figure 6:
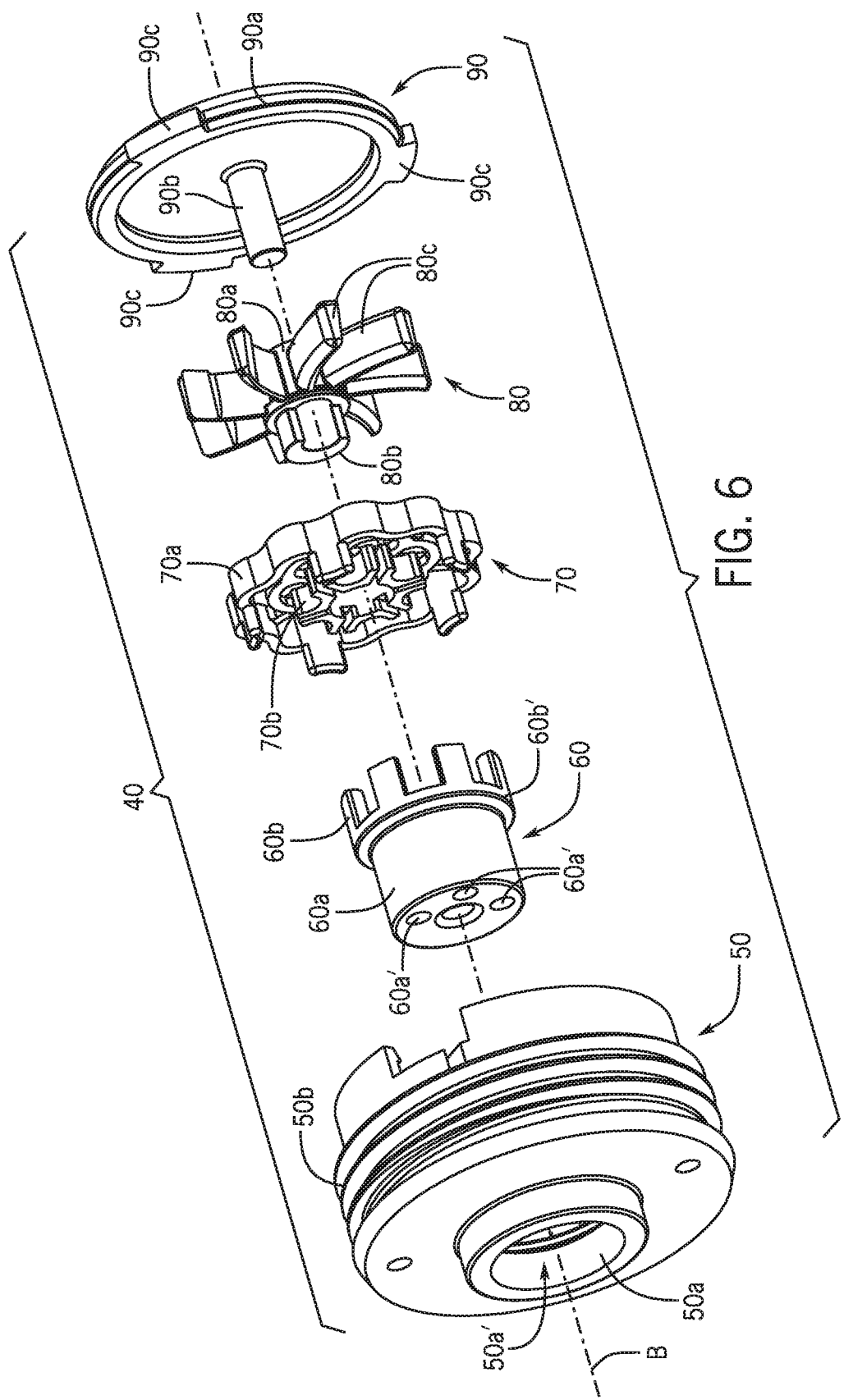
FIG. 6 is an exploded view of a modular spray assembly according to another exemplary embodiment.
Figure 7:
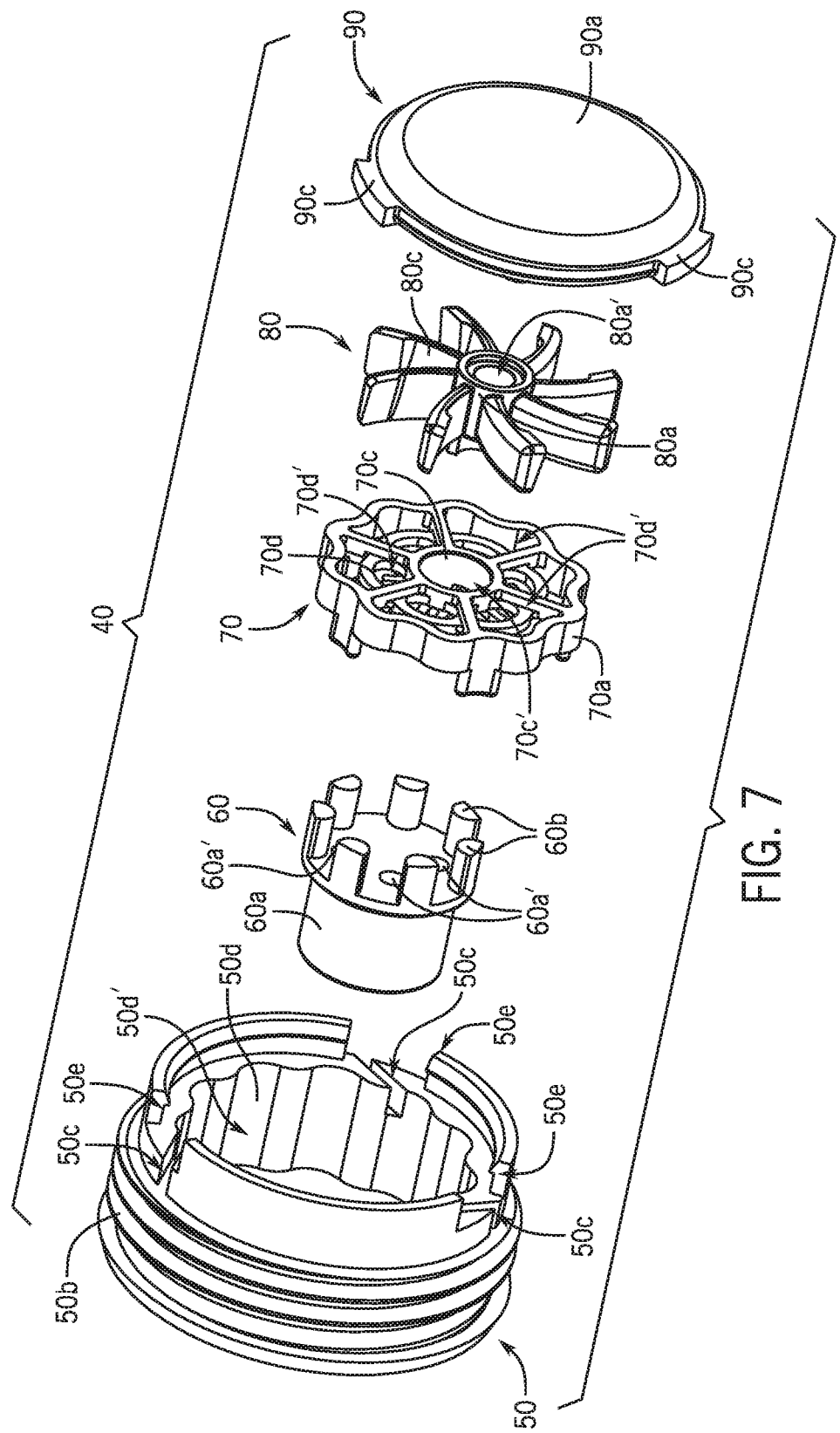
FIG. 7 is another exploded view of the modular spray assembly of FIG. 6.

Referring now to FIGS. 6-22, a modular spray assembly 40 is shown according to another exemplary embodiment. As shown in FIGS. 6-7, the modular spray assembly 40 includes a housing 50. The housing 50 has a generally cylindrical shape and includes a central opening 50a' defined by a wall 50a. The central opening 50a' is configured to receive a spray member 60 (e.g., spray face, etc.) therein, the details of which are described in the paragraphs that follow. The housing 50 further includes one or more inlets 50c disposed circumferentially about the housing. The inlets 50c are configured to direct fluid into a cavity 50d' defined by an inner wall 50d of the housing 50. The inlets 50c are angled to direct fluid toward the vanes of an impeller 80, so as to drive or rotate the impeller, the details of which are described in the paragraphs that follow. The inner wall 50d has an undulating surface profile that extends continuously about an axis "B" defined by the central opening 50a'. The undulating surface profile of the inner wall 50d, advantageously, provides an engagement surface for relative rotational movement of a rotor 70, as will be discussed in further detail below.

Figure 11A:
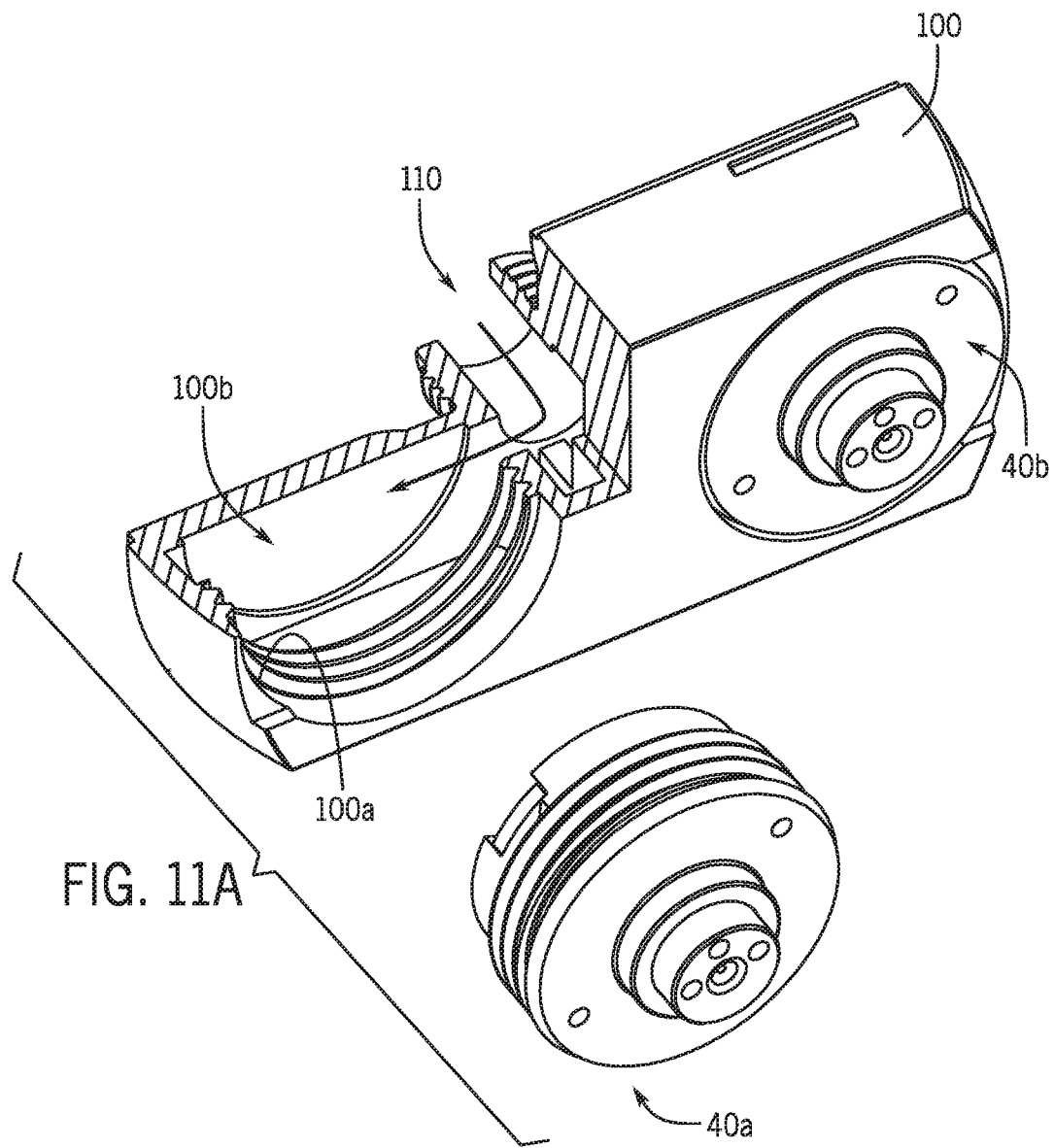
FIGS. 11A-11C illustrate a body of a water delivery device including two modular spray assemblies according to another exemplary embodiment.
Figure 11B:
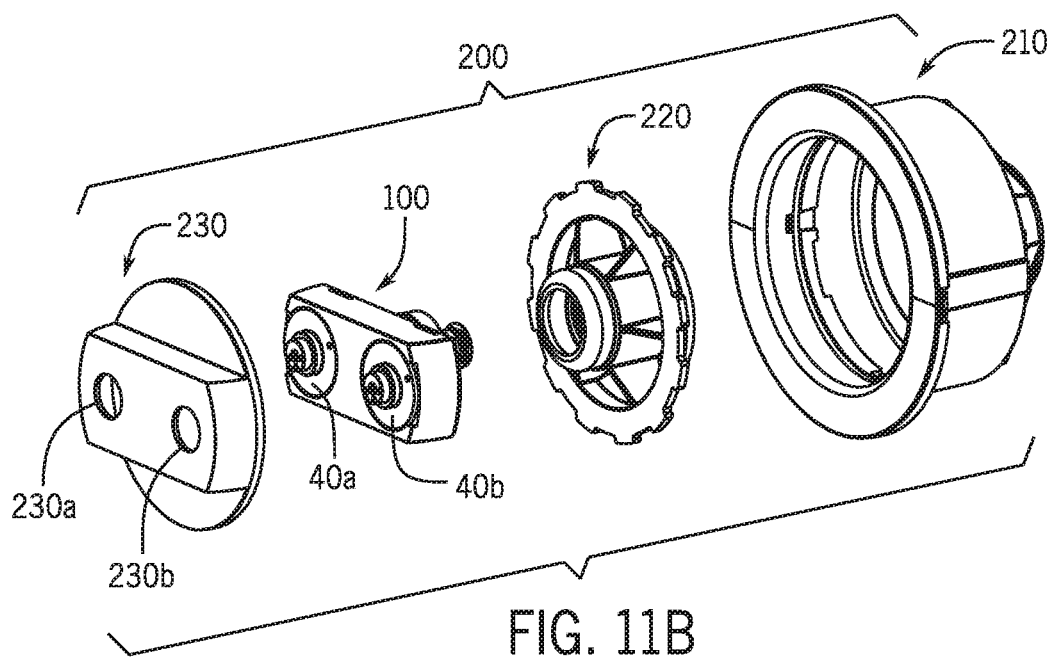
Figure 11C:
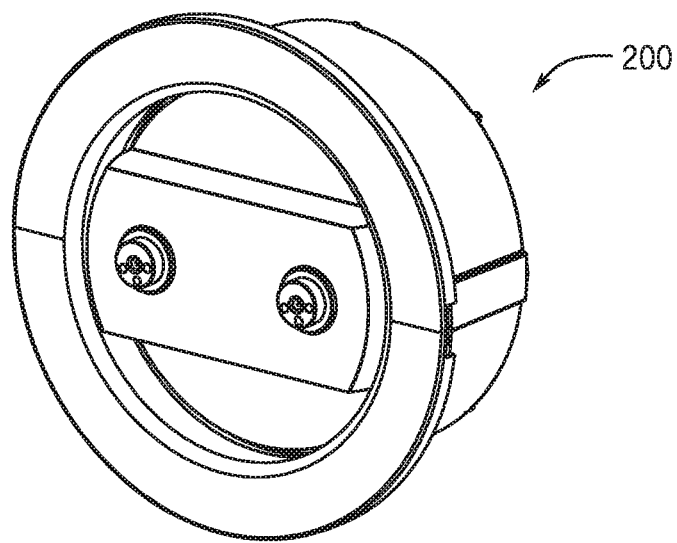
Figure 12:
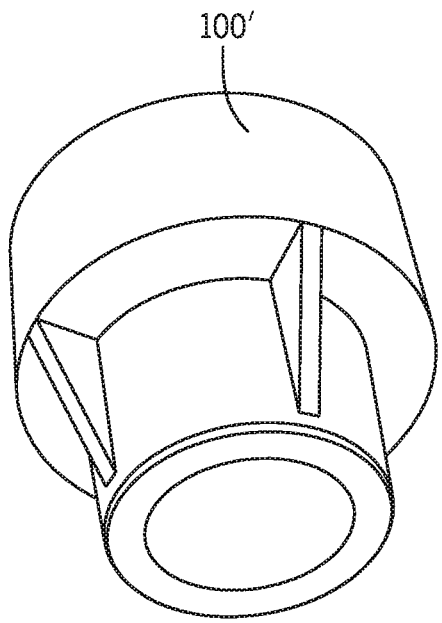
FIGS. 12-13 are perspective views of a sprayer housing according to another exemplary embodiment.
Figure 13:
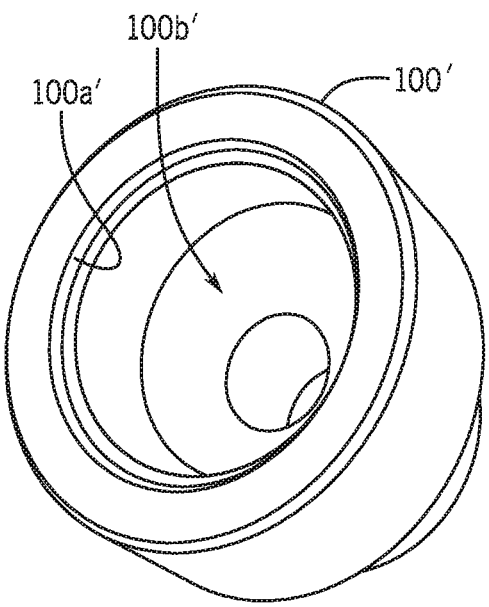
Figure 14:
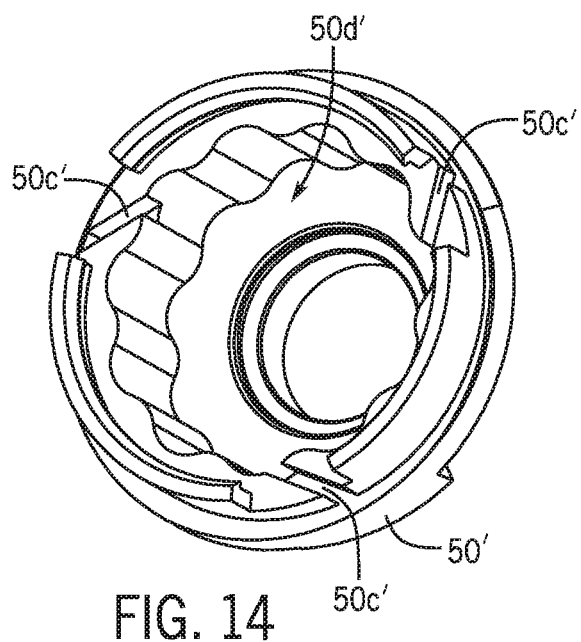
FIGS. 14-15 are perspective views of a housing of a modular spray assembly according to another exemplary embodiment.
Figure 15:
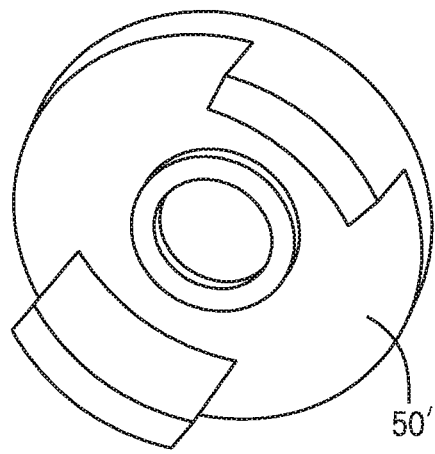
Figure 16:
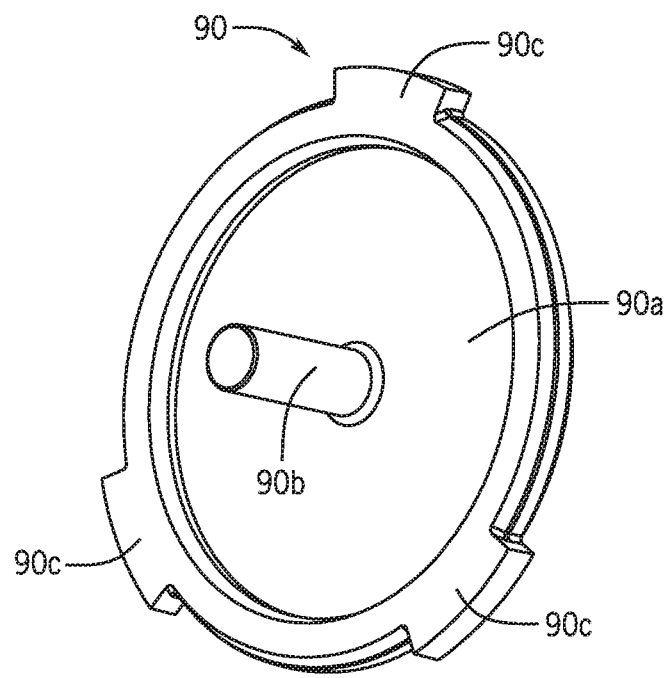
FIG. 16 is a perspective view of a cover of a modular spray assembly according to another exemplary embodiment.

The housing 50 further includes external attachment features, shown as a plurality of threads 50b, for detachably coupling the modular spray assembly 40 to, for example, a body of a water delivery device, such as a spray head, according to an exemplary embodiment. For example, as shown in FIGS. 11A-11C, the modular spray assembly 40 is relatively small in size and is self-contained, so as to allow for integration into a body 100, which can be coupled to a larger water delivery device, such as a spray head or another type of water delivery device (e.g., body sprayer 200, showerhead, handheld sprayer, etc.), the details of which are described in the paragraphs that follow. According to another exemplary embodiment shown in FIGS. 12-13, the modular spray assembly 40 can be coupled directly to a water delivery device shown as, for example, a sprayer housing 100'.

Still referring to FIGS. 6-22, the modular spray assembly 40 further includes a spray member 60 rotatably disposed in the central opening 50a' of the housing 50. As shown in FIGS. 6-7, the spray member 60 includes a first portion 60a and a second portion 60b. The first portion 60a has a generally cylindrical shape and defines a spray face of the modular spray assembly 40. The first portion 60a is configured to be received in the central opening 50a' adjacent the inner wall 50a. The spray member 60 is configured to rotate relative to the inner wall 50a about axis B. A plurality of openings 60a' are disposed in the first portion 60a and are configured to provide a spray of water to a user. The second portion 60b has a diameter that is larger than the diameter of the first portion 60 to define a step for retaining the spray member 60 in the housing 50 along an axial direction. The step defined between the first portion 60a and the second portion 60b includes one or more structural features 60b' (e.g., channels, protrusions, etc.) that cooperate with a portion of the housing 50 to define a labyrinth seal, so as to help to prevent fluid from leaking between the spray member 60 and the housing 50, the details of which will be discussed with respect to FIG. 8 below. The second portion 60b is further defined by a plurality of castellations (e.g., lobes, etc.) that are configured to rollingly engage with corresponding features of the rotor 70, as will be discussed below. The plurality of openings 60a' extend continuously from the first portion 60a through the second portion 60b to provide a fluid flow path from the cavity 50d' to the distal end or spray face of the first portion 60a.

Figure 17:
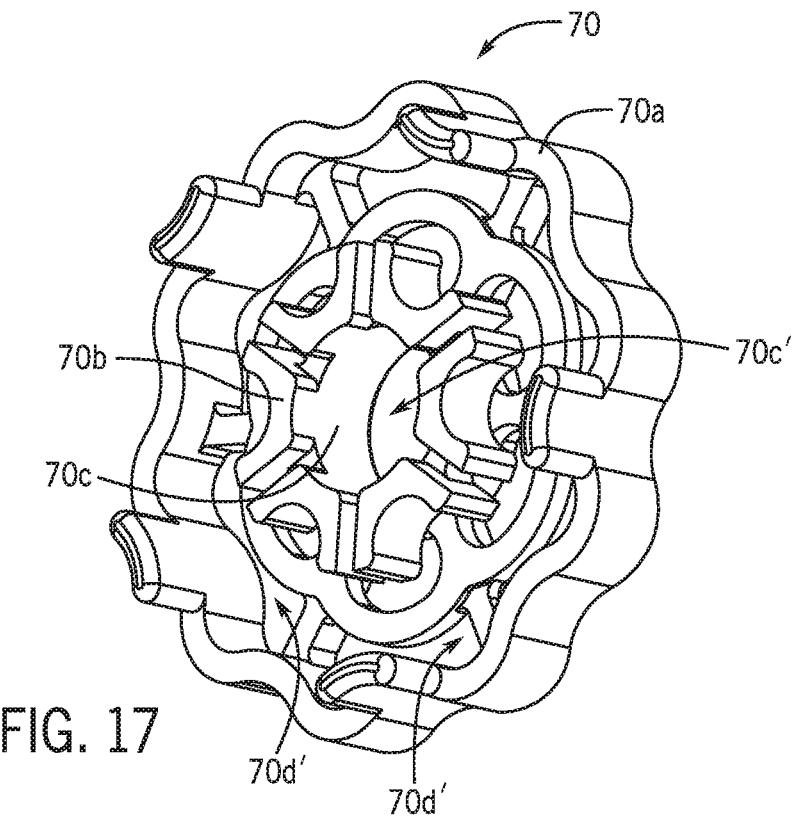
FIG. 17 is a perspective view of a rotor of a modular spray assembly according to another exemplary embodiment.
Figure 18:
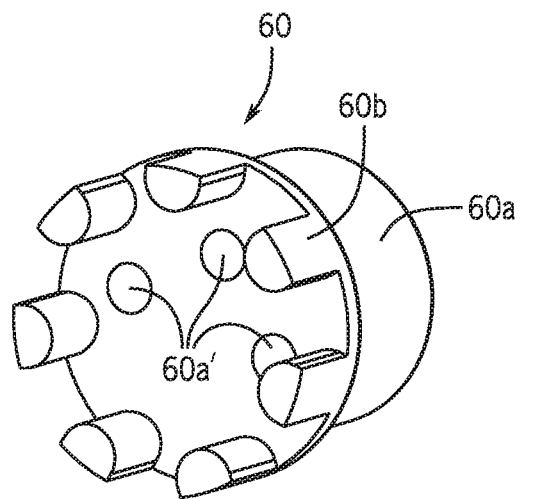
FIGS. 18-19 are perspective views of a spray head of a modular spray assembly according to another exemplary embodiment.
Figure 19:
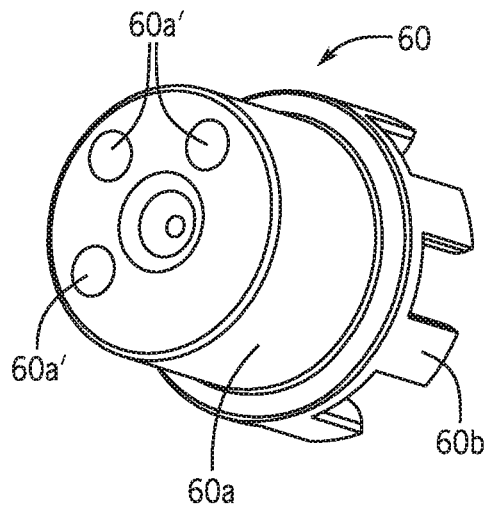
Figure 20:
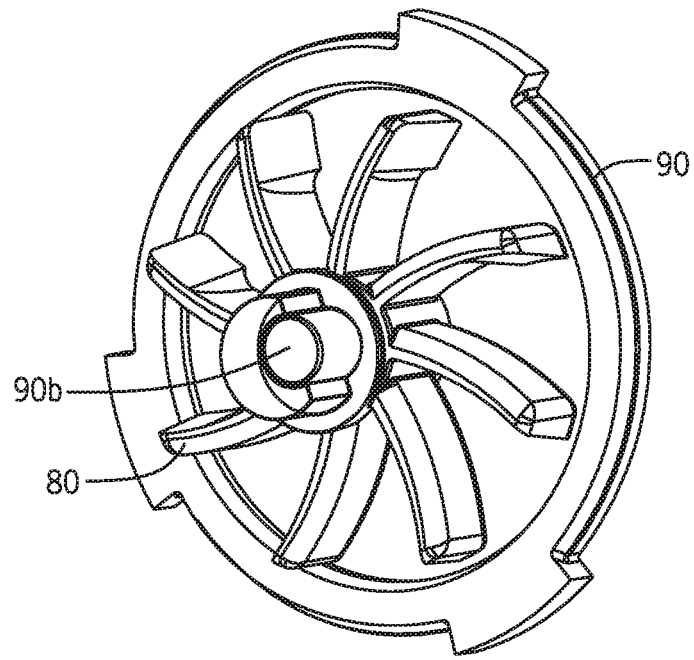
FIG. 20 is a perspective view of an impeller coupled to a cover of a modular spray assembly according to another exemplary embodiment.
Figure 21:
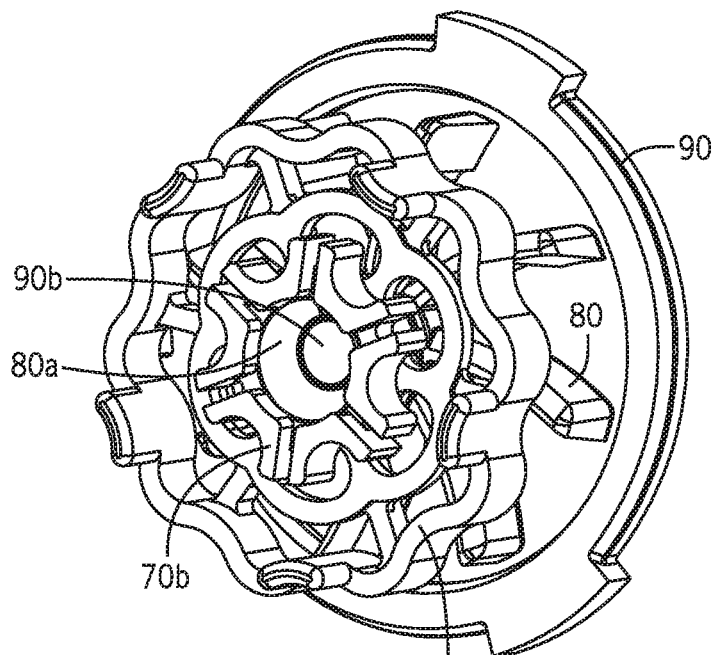
FIG. 21 is a perspective view of a rotor coupled to an impeller and a cover of a modular spray assembly according to another exemplary embodiment.
Figure 22:
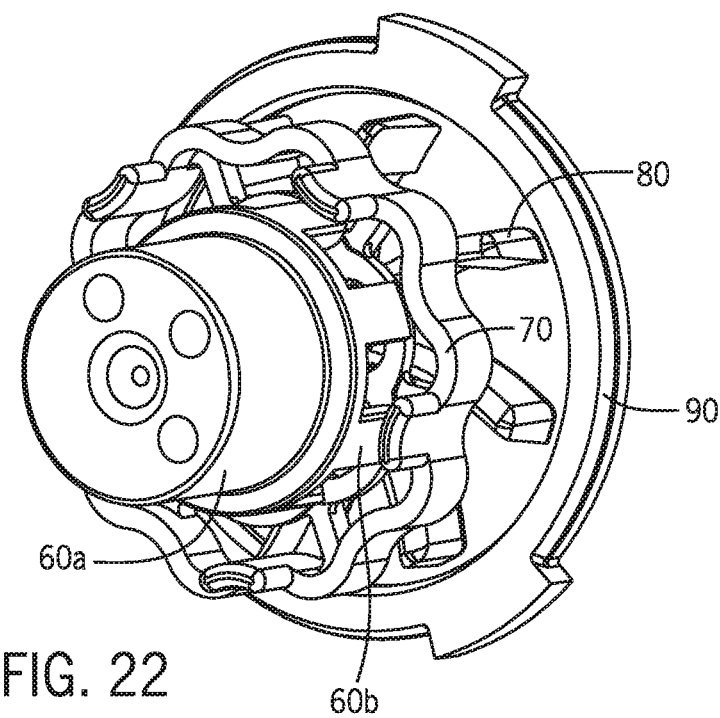
FIG. 22 is a perspective view of a spray head engaged with a rotor, an impeller, and a cover of a modular spray assembly according to another exemplary embodiment.

As shown in FIGS. 6-7 and 17, the modular spray assembly 40 includes a rotor 70 that is configured to rotate eccentrically within the housing 50. The rotor 70 includes an outer portion 70a having a first outer diameter and an inner portion 70b having a second outer diameter that is less than the first outer diameter. The outer portion 70a has an undulating surface profile that corresponds to the undulating surface profile of the inner wall 50d of the housing, such that the outer portion 70a can rollingly engage with the inner wall 50d and permit rotational movement of the rotor 70 relative to the housing 50. That is to say, the rotor 70 can roll against the inner wall 50d via the undulating interface between the outer portion 70a and the inner wall 50d. The outer portion 70a and the inner wall 50d collectively define a first stage of gear reduction for the modular spray assembly 40. The rotor 70 further includes a central portion 70c defining an opening 70c' that is configured to receive a portion of the impeller 80, so as to rotatably couple to, and rotate with, the impeller 80, as discussed below. A plurality of openings 70d' extend through the rotor 70 to allow for fluid to flow from the impeller 80 through the rotor 70 and into the openings 60a' of the spray member 60.

Referring to FIGS. 6-7 and 10, the inner portion 70b defines a surface profile that is configured to rollingly engage with the castellations of the second portion 60b to permit relative rotational movement between the spray member 60 and the rotor 70. In other words, the castellations of the second portion 60b can roll against the inner portion 70b to allow for the spray member 60 to rotate about axis B relative to the rotor 70. The inner portion 70b and the castellations of the second portion 60b collectively define a second stage of gear reduction for the modular spray assembly 40. The first and second stages of gear reduction, advantageously, provide for a particular gear ratio that produces a particular rotational speed of the spray member 60 relative to the housing 50 to produce a unique water spray pattern. This unique spray pattern can provide a more effective user experience, as compared to conventional spray heads operating with the same low, or conventional, inlet flow rate.

As shown in FIGS. 6-9 and 20-21, the modular spray assembly 40 further includes an impeller 80. The impeller 80 includes a first portion 80a defining an opening 80a' configured to rotatably couple to a shaft 90b (e.g., bearing, etc.) of a cover 90. The first portion 80a has a generally hollow cylindrical shape, with the opening 80a' centered about axis B defined by the shaft 90b. The impeller 80 further includes a plurality of vanes 80c (e.g., blades, etc.) extending radially outwardly from the first portion 80a. As shown in FIGS. 8-9, the vanes 80c have a generally arcuate shape and are angled or pitched to direct fluid received from the inlets 50c along an axial direction toward the spray member 60 in response to rotation of the impeller 80 about axis B. In addition, the angular pitch or rake of the vanes 80b can, advantageously, generate a small amount of thrust toward a cover 90 (described below), which can reduce the forces transmitted to other moving parts in the assembly thereby reducing mechanical friction. The impeller 80 further includes a second portion 80b (e.g., eccentric portion, etc.) extending from the first portion 80a. The second portion 80b has a generally cylindrical shape with a center of curvature that is offset from the center of opening 80a' (i.e. axis B). The second portion 80*b* is configured to receive the rotor 70 at the central opening 70*c*', so as to rotatably and eccentrically couple the rotor 70 to the impeller 80. That is to say, the rotor 70 is configured to rotate eccentrically about (i.e. offset from) axis B defined by the opening 80*a*' and the shaft 90*b* via the second portion 80*b*. In this manner, the rotor 70 can also rotate about the second portion 80*b* by rollingly engaging the inner wall 50*d* of the housing 50 via the undulating surface profile of the outer portion 70*a*.

Referring to FIGS. 6-8, 16, and 20-21, the modular spray assembly 40 further includes a cover 90. The cover 90 is configured to couple to the housing 50 to retain the spray member 60, the rotor 70, and the impeller 80 therein. The cover 90 includes a generally planar portion 90*a* and a shaft 90*b* extending outwardly from an inner surface of the planar portion 90*a*. The shaft 90*b* has a generally cylindrical shape and defines an axis of rotation for the impeller 80 (i.e. axis B). The shaft 90*b* is configured to receive the impeller 80, and to permit rotational movement of the impeller relative to the cover 90. The cover 90 further includes one or more tabs 90*c* configured to be received in mating slots 50*e* of the housing 50 to rotationally fix the cover 90 relative to the housing 50. The planar portion 90*a* includes a peripheral flange that is configured to engage a snap feature 50*f* extending circumferentially along at least a portion of the housing 50 to detachably couple the cover 90 to the housing 50. According to other exemplary embodiments, the cover 90 is coupled to the housing 50 using other types of attachment features, such as an interference fit, a bayonet attachment, etc. According to another exemplary embodiment, the modular spray assembly 40 relies on an adjacent wall of a water delivery device (e.g., water delivery device 100, shower head 100', etc.) to function as a cover for the assembly, thereby eliminating the need for a separate cover 90.

The function of the modular spray assembly 40 will now be discussed with respect to FIGS. 8-22. As shown in FIGS. 8-22, a flow of water can enter the housing 50 through one or more of the plurality of inlets 50*c*. For example, as shown in the exemplary embodiment of FIGS. 11A-11C, a plurality of modular spray assemblies 40*a*, 40*b* are coupled to a body 100 of a spray head at a threaded interface 100*a*. According to various exemplary embodiments, the body 100 can be integrated into a larger spray head, such as a body sprayer 200, a showerhead, a handheld sprayer, or another type of water delivery device. By using a modular spray assembly with a separate device, there is more design flexibility for the device, such as permitting the use of decorative surface treatments (e.g., electro-plating, etc.) that would otherwise not be permissible with the modular spray assembly itself (e.g., due to material restrictions associated with the use of low friction components in the modular spray assembly, etc.).

As shown in FIG. 11A, the body 100 defines a cavity 100*b* configured to receive a flow of water 110 therein. The flow of water 110 can occupy or flood the cavity 100*b* to substantially surround the housing 50 to allow water to enter into one or more of the plurality of inlets 50*c* on each modular spray assembly 40*a*, 40*b*. In this way, water can be communicated to the housing 50 through the inlets 50*c*. According to other exemplary embodiments, the housing 50 is fluidly coupled directly to a fluid supply source without a separate body 100.

As shown in the embodiment of FIGS. 11B-11C, the body 100 is coupled to a spray head shown as a body sprayer 200, according to an exemplary embodiment. The body sprayer 200 includes an enclosure 210 for receiving a waterway 220. The waterway 220 is fluidly coupled to the body 100 to communicate a flow of water from a water source to the modular spray assemblies 40*a*, 40*b* of the body 100. The body sprayer 200 further includes a cover 230 removably coupled to the enclosure 210 with the body 100 and waterway 220 disposed therebetween. A portion of each of the modular spray assemblies 40*a*, 40*b* extends through respective openings 230*a*, 230*b* on the cover 230 to direct a water spray from each of the spray assemblies to a user. According to various exemplary embodiments, the cover 230 and/or the housing 210 can include various types of decorative surface treatments to provide a desired aesthetic for the body sprayer 200 (e.g., electro-plating, etc.).

Still referring to FIGS. 8-22, the angle of the inlets 50*c* can, advantageously, direct water toward the plurality of vanes 80*b* of the impeller 80 to rotate the impeller 80 about axis B defined by the shaft 90*b*. Rotation of the impeller 80 causes eccentric rotation of the rotor 70 via the second portion 80*b* of the impeller. That is to say, rotation of the impeller 80 about axis B can cause rotation of the rotor 70 about an axis "C" defined by the second portion 80*b* that is offset from axis B (see, for example, FIG. 10). The rotor 70 can then rotate relative to the second portion 80*b* along the undulating inner wall 50*d* of the housing 50, which defines the first stage of gear reduction for the modular spray assembly 40. More specifically, the outer portion 70*a* can rollingly engage with the undulating surface profile of the inner surface 50*d* when the rotor 70 rotates eccentrically. In this manner, the hydraulic load of the rotor 70 is directed toward the inner wall 50*d* of the housing, so as to limit the amount of load transmitted to other moving parts in the assembly (e.g., spray member 60, etc.), thereby improving the useful life of these components and improving overall efficiency of the system.

The eccentric rotation of the rotor 70 along the inner wall 50*d* can also cause rotation of the spray member 60 about axis B in an opposite rotational direction of the rotor 70 via the inner portion 70*b* and the castellations of the second portion 60*b*. That is to say, the castellations of the second portion 60*b* can rollingly engage with the mating features of the inner portion 70*b* as the rotor 70 rotates eccentrically. This defines the second stage of gear reduction of the modular spray assembly 40. The spray member 60 is constrained axially along axis B via the central opening 50*a*', such that the spray member 60 can only rotate about axis B. The plurality of vanes 80*b* can direct water through the openings 70*d*' of the rotor 70 and into the openings 60*a*' of the spray member 60. The rotating spray member 60 can then provide a spray of water to a user via the openings 60*a*'.

Referring to FIG. 8, the internal hydraulic pressure of water in the cavity 50*d*' of the housing 50 can generate a thrust force on the spray member 60 to urge or bias the spray member 60 toward the wall 50*a* of the housing, which can help to seal between the spray member 60 and the housing. For example, as shown in FIG. 8, the wall 50*a* includes an inner flange portion configured to engage the features 60*b*' on the step of the spray member 60 when the spray member 60 is urged toward the wall 50*a*, so as to define a labyrinth seal therebetween. In this way, the hydraulic pressure in the cavity 50*d*' can maintain contact between the wall 50*a* and the spray member 60 at the labyrinth seal surface to help to prevent water from leaking between the spray member 60 and the housing 50 during operation.

According to various exemplary embodiments, one or more of the components of the modular spray assembly 40 may be made from a low friction material, such as acetal or other similar type of material or combinations of materials.

According to various exemplary embodiments, the modular spray assembly 40 can be reconfigured to allow for conversion of rotary motion into orbital or reciprocal motion to provide for other types of kinetic arrangements.

The spray head 10 and the modular spray assembly 40 can, advantageously, increase the coverage of a water spray or create an improved massaging effect for a user from a low flow rate water source, as compared to conventional water delivery devices. In addition, by using kinetic motion, the disclosed spray head 10 and modular spray assembly 40 can distribute water over a larger area and can help to prevent the numbing sensation that can occur as a result of concentrated water jets impinging on the same area of a user, as is the case with many conventional water delivery devices.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the faucet as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A spray head, comprising:
   a body;
   a rotatable member rotatably coupled to the body, the rotatable member including a plurality of vanes and a plurality of spray nozzles; and
   a first bearing coupled to the body and configured to define a rotational axis of the rotatable member, the first bearing including a longitudinal channel and a plurality of distribution channels extending radially outwardly from the longitudinal channel through the first bearing; and
   wherein the first bearing is configured to direct a flow of water through the longitudinal channel and the plurality of distribution channels toward the plurality of vanes to rotate the rotatable member about the first bearing, so as to direct the flow of water through the plurality of spray nozzles, and wherein the first bearing includes a cutout at each of the plurality of distribution channels to define an exterior surface of the first bearing that is oriented substantially perpendicular to a respective axis of the plurality of distribution channels.

2. The spray head of claim 1, wherein the plurality of spray nozzles includes a first plurality of spray nozzles and a second plurality of spray nozzles, wherein the first plurality of spray nozzles are each oriented to define a spray axis that is different than the orientation of each spray axis of the second plurality of spray nozzles such that water flowing through the first plurality of spray nozzles and through the second plurality of spray nozzles creates a moment about the rotational axis.

3. The spray head of claim 1, wherein the plurality of vanes are configured such that water directed from each of the plurality of distribution channels impinges on a respective vane of the plurality of vanes at a different linear distance from the rotational axis.

4. The spray head of claim 1, wherein the longitudinal channel has a length and a diameter, and wherein a ratio of the length to the diameter is greater than one.

5. The spray head of claim 1, further comprising a second bearing for rotatably coupling the rotatable member to the first bearing, wherein the second bearing includes a bottom wall for coupling to the rotatable member and a center wall extending in a longitudinal direction from the bottom wall, and wherein the center wall defines an inner bearing surface configured to rotatably engage the first bearing.

6. The spray head of claim 5, wherein the first bearing includes a first cylindrical portion for coupling to the body and a second cylindrical portion for rotatably engaging with the second bearing, and wherein the second cylindrical portion has a diameter that is greater than a diameter of the first portion to define a ledge.

7. The spray head of claim 6, wherein the center wall of the second bearing includes a flange extending radially inward toward the rotational axis, and wherein the flange and the ledge of the first bearing cooperatively define a labyrinth seal.

8. The spray head of claim 1, wherein the plurality of distribution channels each define the respective axis of one of the plurality of distribution channels.

9. The spray head of claim 1, wherein the plurality of distribution channels are oriented substantially tangential to a periphery of the longitudinal channel.

10. The spray head of claim 1, wherein each of the plurality of distribution channels has a diameter that is less than a diameter of the longitudinal channel, such that water provided by the plurality of distribution channels impinges on the plurality of vanes to create a reaction moment for a plurality of flow rates.

11. The spray head of claim 1, wherein the rotatable member is configured to rotate at an angular velocity that is maintained constant to continuously rotate the rotatable member, and wherein the angular velocity may be adjusted by repositioning the plurality of distribution channels relative to the plurality of vanes.

12. The spray head of claim 1, wherein the plurality of spray nozzles includes a first plurality of spray nozzles and a second plurality of spray nozzles, and wherein the first plurality of spray nozzles are oriented to define a first spray axis and the second plurality of spray nozzles are oriented to define a second spray axis.

13. The spray head of claim 12, wherein the first plurality of spray nozzles and the second plurality of spray nozzles are arranged in alternating fashion around a circumference of the rotatable member.

14. The spray head of claim 13, wherein the second plurality of spray nozzles produces an outer spray and the first plurality of spray nozzles produces an inner spray, with the inner spray located within the outer spray.

15. The spray head of claim 14, wherein the combination of the outer spray and the inner spray define a quadric spray pattern.

16. The spray head of claim 1, wherein the rotatable member further includes a body, wherein the body has a cylindrical shape where the plurality of vanes are disposed thereon.

17. The spray head of claim 1, wherein the plurality of vanes define an arcuate shape that is angled toward the rotational axis.

* * * * *